(12) United States Patent
Shoarinejad

(10) Patent No.: US 8,169,365 B2
(45) Date of Patent: *May 1, 2012

(54) COMMUNICATION SYSTEM WITH ASSISTED GPS AND SBAS

(75) Inventor: Kambiz Shoarinejad, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 12/341,288

(22) Filed: Dec. 22, 2008

(65) Prior Publication Data

US 2009/0096667 A1    Apr. 16, 2009

Related U.S. Application Data

(63) Continuation of application No. 11/408,665, filed on Apr. 21, 2006, now Pat. No. 7,468,694.

(51) Int. Cl.
*G01S 19/05* (2010.01)

(52) U.S. Cl. .................................. 342/357.42

(58) Field of Classification Search ... 342/357.2–357.78
See application file for complete search history.

(56) References Cited

U.S. PATENT DOCUMENTS

| 6,323,803 B1 * | 11/2001 | Jolley et al. ............... 342/357.42 |
| 7,468,694 B2 * | 12/2008 | Shoarinejad ............. 342/357.42 |
| 2006/0132358 A1 * | 6/2006 | Holderle et al. ......... 342/357.02 |

* cited by examiner

*Primary Examiner* — Thomas Tarcza
*Assistant Examiner* — Nga X Nguyen
(74) *Attorney, Agent, or Firm* — Garlick & Markison; Kevin L. Smith

(57) ABSTRACT

A communication system includes a reference station and a mobile station. The reference station is operable to: receive GPS signals; generate GPS assisting data from the received GPS signals; receive SBAS signals; obtain SBAS data from the received SBAS signals; combine the GPS assisting data and the SBAS data to produce combined GPS data; and transmit the combined GPS data via a terrestrial wireless communication. The mobile station is operable to: receive the GPS signals; receive the combined GPS data via the terrestrial wireless communication; and generate positioning data from the mobile received GPS signals and the combined GPS data.

14 Claims, 4 Drawing Sheets

COMMUNICATION SYSTEM WITH ASSISTED GPS AND SBAS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 11/408,665, entitled "Communication System with Assisted GPS and SBAS," filed Apr. 21, 2006, now issued as U.S. Pat. No. 7,468,694, on Dec. 23, 2008.

TECHNICAL FIELD

The present invention relates generally to communication systems and more particularly to communication systems that utilize assisted Global Positioning System (GSP) data and/or Satellite Based Augmentation System (SBAS) data to determine positioning data.

DESCRIPTION OF RELATED ART

Global Positioning System (GPS) is well known and widely used. For example, GPS is used for vehicle navigation systems, personal locaters, exercise odometers/speedometers, aviation, etc. While there are a wide variety of applications of GPS, there are currently two primary issues. One issue relates to the relative inaccuracy and unreliability of GPS receivers for aviation and the second issue is weak signal reception due to obstructions (e.g., buildings, garage structures, geography, etc.)

To address the first issue, the United States (e.g., Wide Area Augmentation System—WAAS), Europe (e.g., European Geostationary Navigation Overlay Service—EGNOS), and Japan (e.g., Multi-transport Satellite Augmentation System—MSAS) are each developing a compatible Satellite Based Augmentation System (SBAS) mainly to improve aviation safety. In general, an SBAS system is a satellite based differential GPS system (DGPS) with a reference network of GPS ground stations collecting and transferring error measurements to one or more ground central control units. The central control unit(s) calculates error correction terms and transfers them to geostationary satellites. The geostationary satellites transmit correction terms in "GPS-like" signals back to SBAS-enabled GPS receivers, which then use the data to correct for the errors. This is similar to Differential GPS (DGPS) except that in DGPS, each reference station calculates the error corrections individually and broadcasts it in its neighborhood, unlike SBAS where the correction terms are obtained in a central unit using multiple reference stations and are communicated to GPS receivers via geostationary satellites.

In one implementation of an SBAS system, a number of GPS receiver stations, which may also be referred to as RIMS (Ranging and Integrity Monitoring Stations), are positioned throughout a geographic area. The position of the GPS receiver stations must be precisely known (e.g., accuracy to within a few centimeters), which enables the RIMS to calculate the difference between the known position of the station and the position as calculated by the GPS receiver. Further, since RIMS receivers use both GPS frequencies (L1 and L2) the signal delay through the ionosphere can be calculated for every single satellite. Still further, if the signals from more than four satellites are received, more information than needed for a position determination is available, this information may be used to check for possible problems with the satellites or deviations in their orbits or time, which includes long term errors of the satellite orbits, short term and Long term errors of the satellite clocks, ionosphere (IONO) correction grids, and integrity information. From the integrity information, it is possible to inform users within six seconds of problems that occur with the GPS system. The IONO correction grid is used to correct for ionosphere signal delay, which is typically the largest source of error in GPS position determinations.

To address the second issue (i.e., weak signal reception due to obstructions), an assisted GPS system was developed. The assisted GPS system includes a network of reference GPS stations that provide assisting data to GPS-enabled mobile devices through a cellular network. Note that the reference GPS stations may or may not reside at the base stations. In one instance, the assisting data includes satellite almanac, satellite ephemeris, and satellite clock error information, which are derived from 50 Hz navigation data. In another instance, the assisting data may include the bits of the 50 Hz navigation data. By providing this information to a GPS receiver via a cellular system as opposed to the GPS receiver attempting to extract the information from a weak GPS signal, the receiver's acquisition time (or the Time to First Fix (TTFF)) is improved and the GPS receiver is relieved from the requirement to decode the data, which may increase the coherent integration interval and hence achieve considerably better sensitivity.

As is known, assisted GPS systems can be implemented in two different modes: mobile-assisted and mobile-based. In a mobile-assisted system, a mobile device that includes the GPS receiver processing received GPS signals to obtain only correlation outputs and/or raw measurements, which are then transmitted back to the base station where the complete navigation solution is obtained. In a mobile-based system, the complete navigation solution is obtained within the mobile and communicated back to the base station.

As is further known, the assisting data exchange may be done on either the control plane or the user plane of the cellular system. For the control plane exchange, an A-GPS server is integrated into the cellular network infrastructure and the assisting data is provided over the signaling channels. In this case, the A-GPS server connects to the Serving Mobile Location Center (SMLC) and the assisting data travels through the Mobile Switching Center (MSC) to the base station and ultimately to the GPS-enabled mobile device. For the user plane exchange, the A-GPS server is essentially independent of the cellular network infrastructure and the assisting data is provided through user plane communication channels. In this case, the A-GPS server connects to the A-GPS client on the mobile device simply through say the IP connection. For example, the data may simply travel through Gateway GPRS Support Node (GGSN) to the Serving GPRS Support Node (SGSN) to the base station controller and the base station and ultimately to the GPS-enabled mobile device. Note that standards have been developed to standardize the assisting message contents and signaling for both user plane and control plane.

While SBAS addresses the first issue and the Assisted-GPS addresses the second issue, a need still exists for a system that addresses both issues.

BRIEF SUMMARY OF THE INVENTION

The present invention is directed to apparatus and methods of operation that are further described in the following Brief Description of the Several Views of the Drawings, the Detailed Description of the Drawings, and the claims. Other features and advantages of the present invention will become apparent from the following detailed description of the invention made with reference to the accompanying drawings.

DETAILED DESCRIPTION OF THE DRAWINGS

Figure 1:
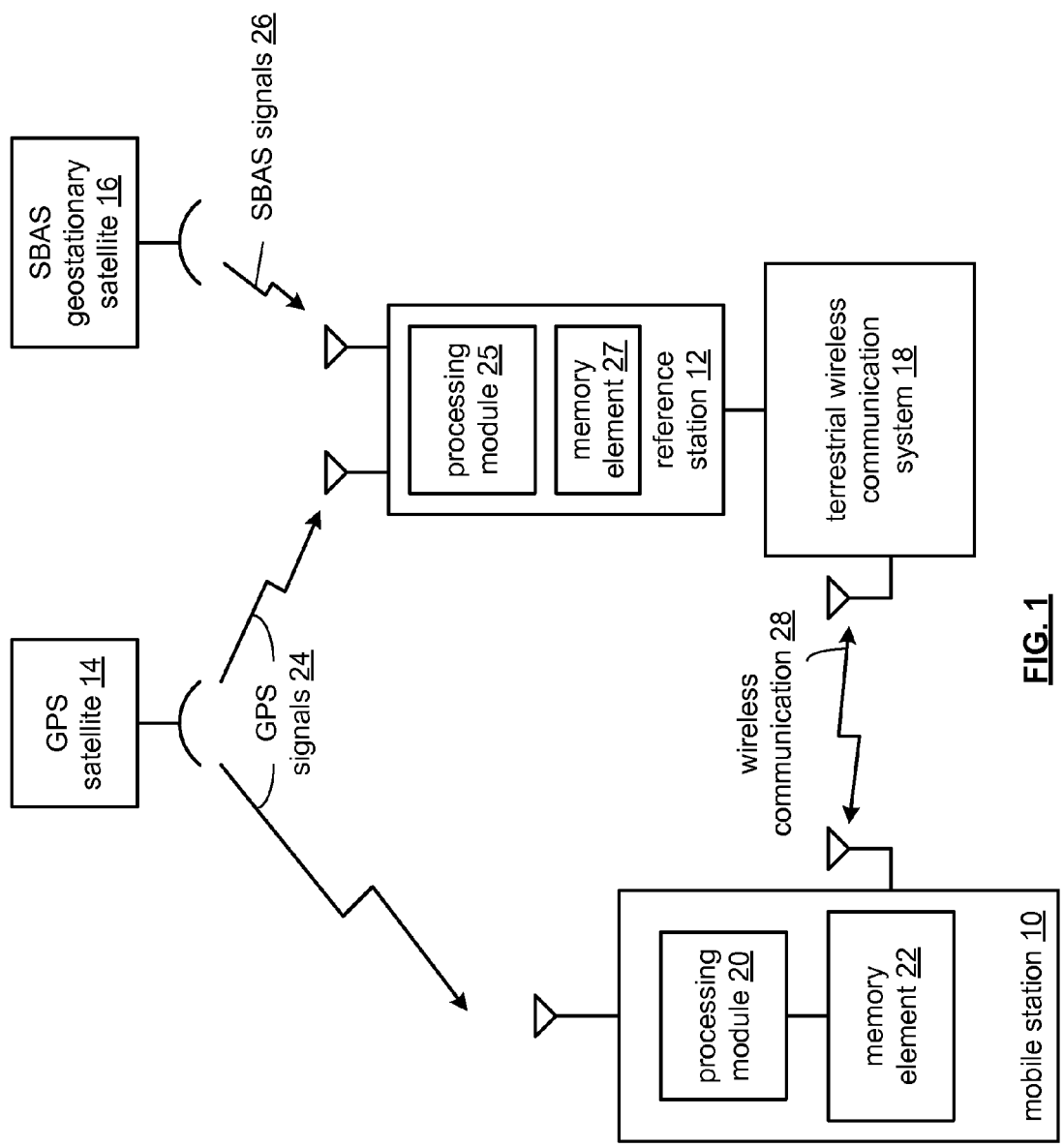
FIG. 1 is a schematic block diagram of a communication system in accordance with the present invention.

FIG. 1 is a schematic block diagram of a communication system that includes a mobile station 10, a reference station 12, a global positioning system (GPS) satellite 14, a Satellite Based Augmentation System (SBAS) geostationary satellite 16, and a terrestrial wireless communication system 18. As one of ordinary skill in the art will appreciate, the communication system may include more than one mobile stations, reference stations, GPS satellites, SBAS geostationary satellites and terrestrial wireless communication systems.

The mobile station 10 includes a processing module 20 and a memory element 22. The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, radio frequency (RF) transceiver circuitry, GPS receiver circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 20 implements one or more of its functions via a state machine, analog circuitry, digital circuitry, RF transceiver circuitry, GPS receiver circuitry, and/or logic circuitry, the memory element storing corresponding operational, or hard coded, instructions may be embedded within, or external to, the circuitry comprising the state machine, analog circuitry, digital circuitry, RF transceiver circuitry, GPS receiver circuitry, and/or logic circuitry. Further note that, the memory element 22 stores, and the processing module 20 executes, hard coded and/or operational instructions corresponding to at least some of the steps and/or functions illustrated in FIGS. 1 through 4.

The reference station 12 includes a processing module 25 and a memory element 27. The processing module 25 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, radio frequency (RF) transceiver circuitry, GPS receiver circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 25 implements one or more of its functions via a state machine, analog circuitry, digital circuitry, RF transceiver circuitry, GPS receiver circuitry, and/or logic circuitry, the memory element storing corresponding operational, or hard coded, instructions may be embedded within, or external to, the circuitry comprising the state machine, analog circuitry, digital circuitry, RF transceiver circuitry, GPS receiver circuitry, and/or logic circuitry. Further note that, the memory element 27 stores, and the processing module 25 executes, hard coded and/or operational instructions corresponding to at least some of the steps and/or functions illustrated in FIGS. 1 through 4.

In operation, the reference station 12, which may be affiliated with a base station of the terrestrial wireless communication system 18 or be a stand alone device that is coupled (e.g., wirelessly or wired) to the terrestrial wireless communication system 18, receives GPS signals 24 from the GPS satellite(s) 14 and SBAS signals 26 from the SBAS geostationary satellite(s) 16. GPS receiver circuitry of reference station's processing module 25 processes the GPS signals 24 in accordance with conventional assisted GPS systems to produce GPS assisting data. The GPS assisting data includes one or more of satellite almanac information, satellite ephemeris, satellite clock error information, and 50 Hz raw navigation data bits.

In addition, the GPS receiver circuitry of the reference station's processing module 25 processes the SBAS signals 26 in accordance with conventional SBAS satellite systems to obtain SBAS data. The SBAS data may include different data types such as integrity information, fast corrections, ionospheric grid point masks, GEO navigation message, et cetera. The SBAS data can be used to obtain one or more of long term errors of satellite orbits, short and long term errors of satellite clocks, ionosphere correction grids, and integrity information. Further, the processing module 25 of the reference station may correct the GPS assisting data based on the SBAS data to produce corrected GPS assisting data.

When the mobile station 10, which may be a cellular telephone, walkie-talkie, personal digital assistant (PDA), navigation system, personal locator, object locator, a Personal Navigation Devices (PND), and/or any mobile or portable device that is transportable by a person and/or a vehicle, attempts to determine its position (e.g., latitude, longitude, height, and/or velocity), it may receive GPS signals 24 from GPS satellites 14 and GPS assistance information via a wireless communication 28 from the reference station 12. The content of the GPS assistance information may vary based on one or more factors that include, but are not limited to, the capabilities of the mobile station (e.g., SBAS enabled, assisted GPS enabled), mobile station required assistance, and mobile station—reference station service relationship.

For example, if the mobile station 10 is SBAS enabled and the mobile station has a selectable service relationship with the reference station, the mobile station 10 may request one or more data elements (e.g., integrity information, fast corrections, ionospheric grid point masks, GEO navigation message, etc. or computations thereof to obtain one or more of long term errors of satellite orbits, short and long term errors of satellite clocks, ionosphere correction grids, and integrity information) of the SBAS data and/or one or more data elements (e.g., satellite almanac information, satellite ephemeris, satellite clock error information, and 50 Hz raw navigation data bits) of the GPS assisting data. In this example, GPS receiver circuitry of the processing module 20 may process the received GPS signals 24 based on the selected elements of the SBAS data and/or the selected data elements of the GPS assisting data to determine its position.

As another example, if the mobile station 10 has a mobile assisted relationship with the reference station, the reference station 12 provides corrected GPS assisting data (i.e., GPS assisting data corrected based on the SBAS data) to the mobile station. The GPS receiver circuitry of the mobile station 10 then uses the corrected GPS assisting data to process the received GPS signals 24 to determine its position. As yet another example, if the mobile station 10 has a mobile-based relationship with the reference station 12, the reference station 12 provides the GPS assisting data and the SBAS data to the mobile station 10. The GPS receiver circuitry of the mobile station 10 then uses this data to process the received GPS signals 24 to determine its position.

As yet another example, the mobile station 10 may determine the signal strength of the received GPS signals and/or the desired accuracy of its position. If the signal strength is good (i.e., the mobile station reception of the GPS signals 24 is not significantly obstructed by buildings, natural structures, etc.) and the desired accuracy is nominal (i.e., a typical GPS receive is accurate to within a few tens of meters), then the mobile station 10 may process the GPS signals 24 without assistance from the reference station 12. If, however, the signal strength and/or the desired accuracy is less than nominal, the mobile station may request assistance from the reference station as in any of the preceding examples.

As one of ordinary skill in the art will appreciate, there is a wide variety of ways to provide assistance to a mobile station from a reference station. In addition, the assistance provided by the reference station to the mobile may be done at the user level (e.g., a telephone call) of the terrestrial wireless communication (e.g., a cellular system, paging system, a point-to-point system, etc.) or at the control level (e.g., within the control data exchanged with a mobile unit via a control channel).

Figure 2:
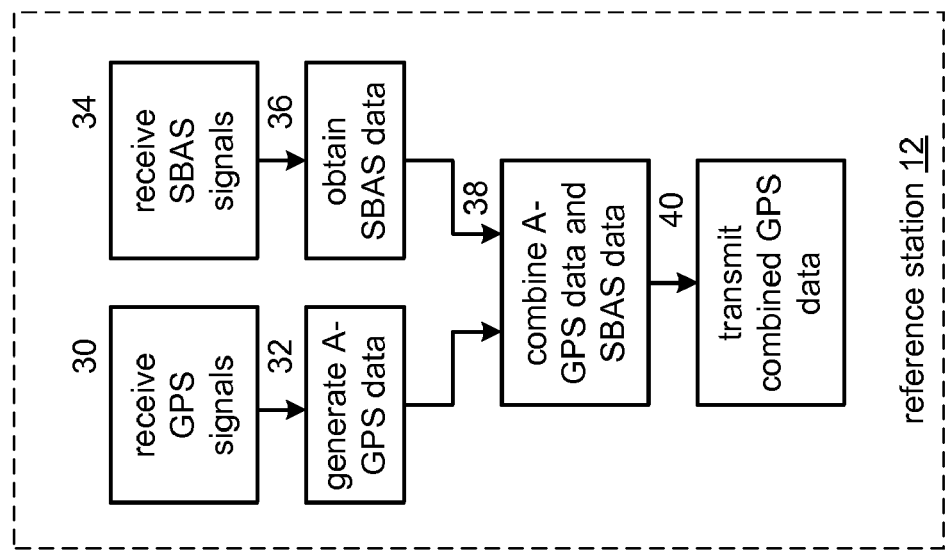
FIG. 2 is a functional diagram of a mobile station and a reference station in accordance with the present invention.
Figure 2:
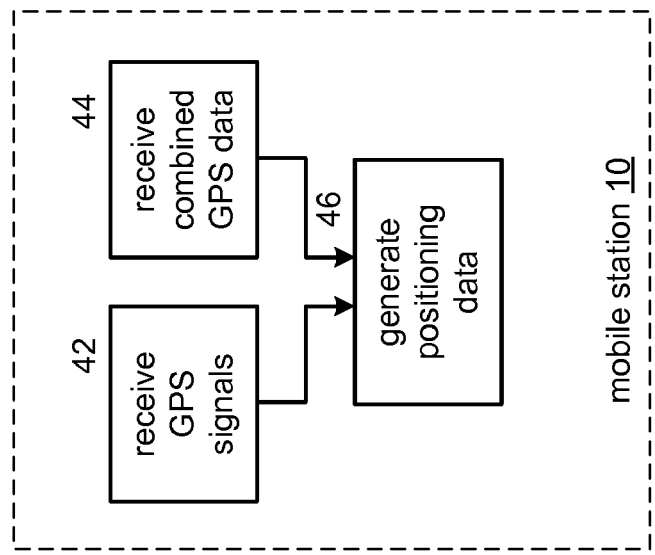

FIG. 2 is a functional diagram of a mobile station 10 and a reference station 12. In this illustration, the processing modules 20 and 25 of the mobile station 10 and reference station 12 perform the functions shown. In particular, the reference station 12 receives Global Positioning System (GPS) signals at functional step 30 and receives Satellite Based Augmentation System (SBAS) signals at functional step 34. To receive these signals, the processing module 25 includes GPS receiver circuitry. The reference station 12 generates GPS assisting data from the received GPS signals at functional step 32. For example, the reference station may generate one or more satellite almanac information, satellite ephemeris, satellite clock error information, and 50 Hz raw navigation data bits as the GPS assisting data.

The reference station 12 obtains SBAS data from the received SBAS signals at functional step 36. The SBAS data may be derived from the SBAS signals or contained within the SBAS signals. In either method, the SBAS data may include different data types such as integrity information, fast corrections, ionospheric grid point masks, GEO navigation message, etc., which can be used to obtain one or more of long term errors of satellite orbits, short and long term errors of satellite clocks, ionosphere correction grids, and integrity information. The reference module then combines the GPS assisting data and the SBAS data to produce combined GPS data at functional step 38.

The combining of the data may be done in a variety of ways and/or based on a relationship between the mobile station and the reference station. For example, the combining of the GPS assisting data and the SBAS data may be done by storing the GPS assisting data and the SBAS data in memory. Then the reference station may generate at least one frame of the wireless communication to include at least a portion of the GPS assisting data and at least a portion of the SBAS data to produce the combined GPS data. In another example, the combining of the GPS assisting data and the SBAS data may be done by obtaining at least one error correction term from the SBAS data and then modifying, or correcting, the GPS assisting data based on the at least one error correction term to produce the combined GPS data. Once the combined data is produced, the reference station 12 transmits it to the mobile station via a terrestrial wireless communication at functional step 40. Note that the transmitting of the combined GPS data may be done via a control plane or a user plane associated with the terrestrial wireless communication.

The mobile station 10 receives the GPS signals at functional step 42 and receives the combined GPS data at functional step 44. The mobile station 10 then generates positioning data from the mobile received GPS signals and the combined GPS data. Note that the determining of the positioning data may be done by using one or more of the SBAS data, the GPS assisting data, and the corrected GPS assisting data to process the GPS signals. For example, if the mobile station includes SBAS processing circuitry, the mobile station may receive the SBAS data to process the GPS signals. Alternatively, if the mobile station includes assist GPS circuitry (e.g., wireless transceiver circuitry and GPS receiver circuitry), the mobile station may receive the corrected GPS assisting data.

Figure 3:
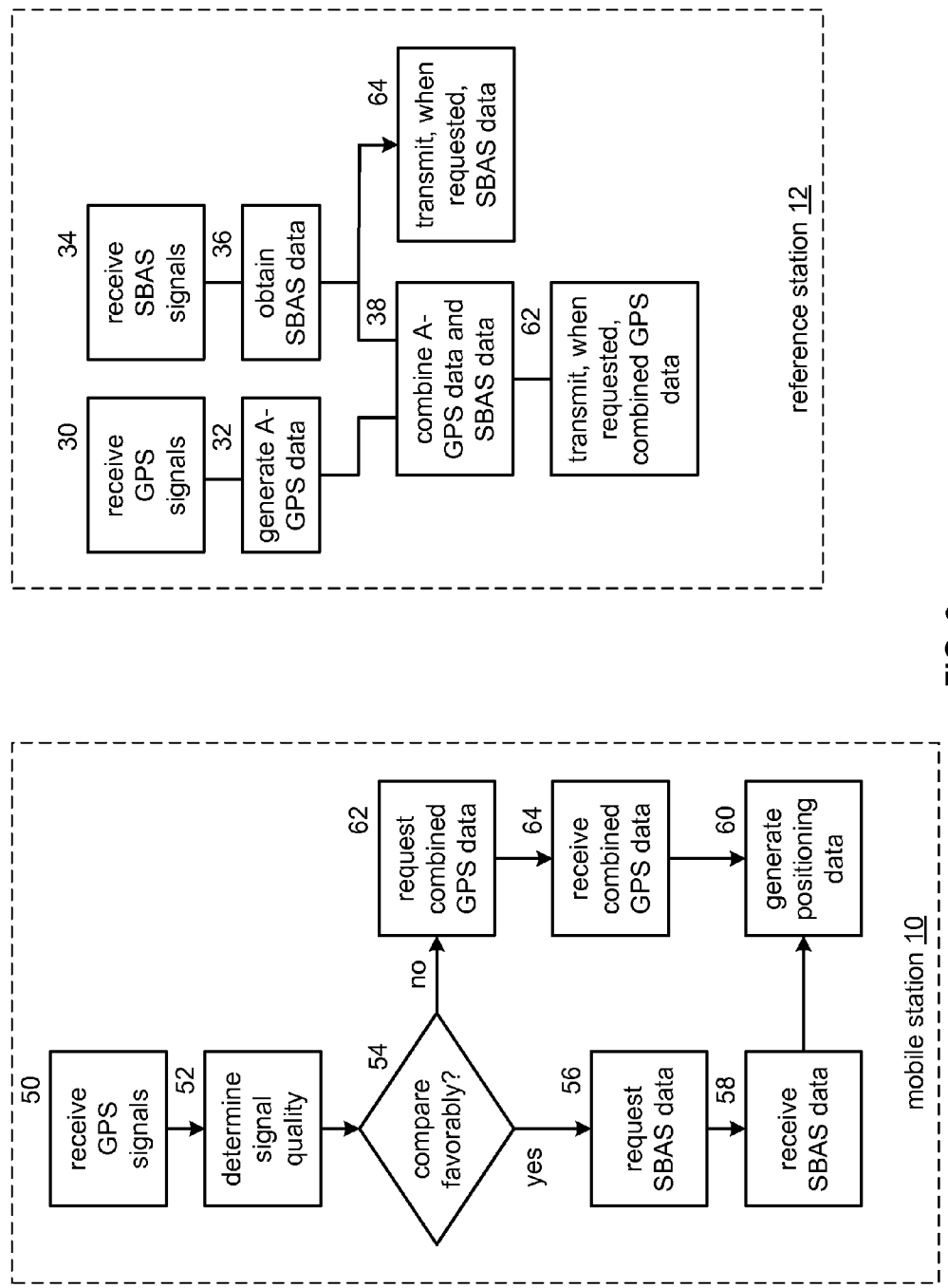
FIG. 3 is another functional diagram of a mobile station and a reference station in accordance with the present invention.

FIG. 3 is another functional diagram of a mobile station 10 and a reference station 12. In this illustration, the processing modules 20 and 25 of the mobile station 10 and reference station 12 perform the functions shown. In particular, the reference station 12 receives Global Positioning System (GPS) signals at functional step 30 and receives Satellite Based Augmentation System (SBAS) signals at functional step 34. The reference station 12 generates GPS assisting data from the received GPS signals at functional step 32. The reference station 12 obtains SBAS data from the received SBAS signals at functional step 36. The reference module then combines the GPS assisting data and the SBAS data to produce combined GPS data at functional step 38.

Depending on requested information from the mobile station, the reference station 12 will either transmit the SBAS data at functional step 64 or the combined GPS data at functional step 62. The request may be directly received from the mobile station or determined based on the relationship between the mobile station and the reference station. For example, if the relationship is a mobile-assisted one, the reference station will determine that the mobile station is requesting the combined GPS data and when the relationship is a mobile-based one, the reference station will determine that the mobile station is requesting the SBAS data.

The mobile station receives the GPS signals at functional step 50 and determines the signal quality of the GPS signals at functional step 52. The signal quality may be a measure of signal strength, acquisition time, number of satellites, etc. The mobile station then compares the signal quality of the received GPS signals with a threshold (e.g., a level corresponding to an acceptable measure of signal strength, acquisition time, number of satellites, etc.) functional step 54. In addition to or in the alternative of, the comparison may factor in the relationship between the mobile station and the reference station. As such, additional GPS information from the reference station may be provided upon request and/or based on the relationship between the mobile station and the reference station.

When the comparison is favorable, the mobile station 10 requests the SBAS data at functional step 56, which may be done by a specific request for the SBAS data via the terrestrial wireless communication or by an indication that the mobile station is attempting to determine its position and the relationship is mobile-based. At functional step 58, the mobile station receives the SBAS data and, at functional step 60, generates positioning data using the SBAS data to process the GPS signals.

When the comparison is unfavorable, the mobile station requests the combined GPS data at functional step 62, which may be done by a specific request for the combined GPS data via the terrestrial wireless communication or by an indication that the mobile station is attempting to determine its position and the relationship is mobile-assisted. At functional step 64, the mobile station receives the combined GPS data via the terrestrial wireless communication. The mobile station then generates positioning data from the received GPS signals and the combined GPS data at functional step 60.

Figure 4:
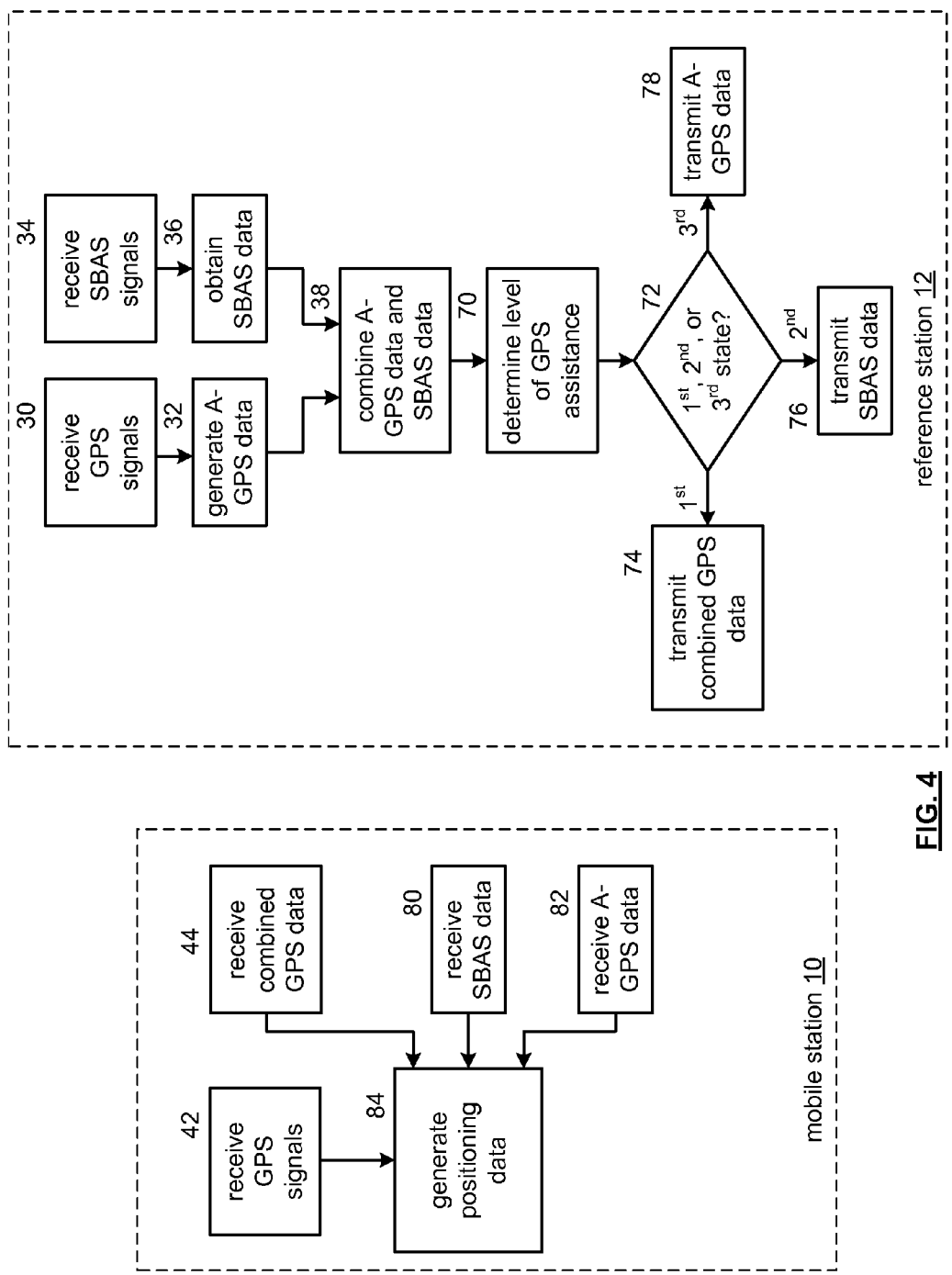
FIG. 4 is yet another functional diagram of a mobile station and a reference station in accordance with the present invention.

FIG. 4 is yet another functional diagram of a mobile station 10 and a reference station 12. In this illustration, the processing modules 20 and 25 of the mobile station 10 and reference station 12 perform the functions shown. In particular, the reference station 12 receives Global Positioning System (GPS) signals at functional step 30 and receives Satellite Based Augmentation System (SBAS) signals at functional step 34. The reference station 12 generates GPS assisting data from the received GPS signals at functional step 32. The reference station 12 obtains SBAS data from the received SBAS signals at functional step 36. The reference module then combines the GPS assisting data and the SBAS data to produce combined GPS data at functional step 38.

The reference station further determines the mobile station's level of GPS assistance at functional step 70. This may be done based on the relationship between the mobile station and the reference station and/or information provided by the mobile station. When the mobile station level of GPS assistance is in a first state as determined at functional step 72, the reference station transmits the combined GPS data via a terrestrial wireless communication to the mobile station at functional step 74. When the mobile station level of GPS assistance is in a second state as determined at functional step 72, the reference station transmits the SBAS data to the mobile station at functional step 76. When the mobile station level of GPS assistance is in a third state as determined at functional step 72, the reference station transmits the GPS assisting data to the mobile station at functional step 78.

The mobile station receives the GPS signals at functional step 42. Based on the state of the mobile station's need for assistance, the mobile station will receive the combined GPS data at functional step 44, the SBAS data at functional step 80, or the GPS assisting data at functional step 82. The mobile station then generate positioning data from the GPS signals based on the received one of the combined GPS data, the SBAS data, or the GPS assisting data.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented several embodiments of a communication system that includes a reference station and a mobile station to facilitate improved GPS functionality. For example, a communication system may combine the benefits of an SBAS system and an assisted GPS system. As one of ordinary skill in the art will appreciate, other embodiments may be derived from the teachings of the present patent application without deviating from the scope of the claims.

What is claimed is:

1. A communication system comprises:
    a reference station operable to:
        receive Global Positioning System (GPS) signals to produce received GPS signals;
        generate GPS assisting data from the received GPS signals;
        receive Satellite Based Augmentation System (SBAS) signals to produce received SBAS signals;
        obtain SBAS data from the received SBAS signals;
        combine the GPS assisting data and the SBAS data to produce combined GPS data; and
        transmit the combined GPS data;
    a mobile station operable to:
        receive the GPS signals to produce mobile received GPS signals;
        receive the combined GPS data; and
        generate positioning data from the mobile received GPS signals and the combined GPS data.

2. The communication system of claim 1, wherein the SBAS data comprises at least one of:
    integrity information, fast corrections, ionospheric grid point masks, GEO navigation message, or computations thereof to obtain one or more of long term errors of satellite orbits, short and long term errors of satellite clocks, ionosphere correction grids, and integrity information.

3. The communication system of claim 1, wherein the combining the GPS assisting data and the SBAS data further comprises:

storing the GPS assisting data;
storing the SBAS data; and
generating at least one frame of a terrestrial wireless communication to include at least a portion of the GPS assisting data and at least a portion of the SBAS data to produce the combined GPS data.

4. The communication system of claim 1, wherein the combining the GPS assisting data and the SBAS data further comprises:
obtaining at least one error correction term from the SBAS data; and
modifying the GPS assisting data based on the at least one error correction term to produce the combined GPS data.

5. The communication system of claim 1, wherein the transmitting the combined GPS data comprises at least one of:
transmitting the combined GPS data via a control plane associated with a terrestrial wireless communication; and
transmitting the combined GPS data via a user plane associated with the terrestrial wireless communication.

6. A mobile station comprises:
a processing module; and
a memory element operably coupled to the processing module, wherein the memory element stores operational instructions that cause the processing module to:
receive combined Global Positioning System (GPS) data, the combined GPS data including GPS assisting data and Satellite Based Augmentation System (SBAS) data;
receive GPS signals to produce received GPS signals; and
generate positioning data from the received GPS signals and the combined GPS data.

7. The mobile station of claim 6, wherein the combined GPS data comprises:
adjusting the GPS assisting data of the combined GPS data based on at least one error correction term of the SBAS data.

8. The mobile station of claim 6 wherein the memory element further stores operational instructions that cause the processing module to:
determine a signal quality of the received GPS signals;
compare the signal quality of the received GPS signals with a threshold;
when the signal quality of the received GPS signals compares unfavorably with the threshold, provide a request for the combined GPS data; and
transmit the request for the combined GPS data.

9. The mobile station of claim 6 wherein the memory element further stores operational instructions that cause the processing module to:
receive the combined GPS data via a control plane of a terrestrial wireless communication system or via a user plane of the terrestrial wireless communication system.

10. A method for determining a mobile station position, the method comprises:
receiving combined Global Positioning System (GPS) data, the combined GPS data including GPS assisting data and Satellite Based Augmentation System (SBAS) data;
receiving GPS signals to produce received GPS signals;
generating positioning data relating to the mobile station based on the received GPS signals and the combined GPS data; and
providing the positioning data.

11. The method of claim 10, wherein the combined GPS data comprises:
adjusting the GPS assisting data based on at least one error correction term of the SBAS data.

12. The method of claim 10, wherein the combined GPS data comprises:
obtaining at least one error correction term from the SBAS data; and
modifying the GPS assisting data based on the at least one error correction term to produce the combined GPS data.

13. The method of claim 10 further comprises:
determining signal quality of the received GPS signals;
comparing the signal quality of the received GPS signals with a threshold;
when the signal quality of the received GPS signals compares unfavorably with the threshold, providing a request for the combined GPS data; and
transmitting the request for the combined GPS data.

14. The method of claim 10 wherein receiving the combined GPS data comprises at least one of:
receiving the combined GPS data via a control plane of a terrestrial wireless communication system; and
receiving the combined GPS data via a user plane of the terrestrial wireless communication system.

* * * * *